US009829994B2

(12) United States Patent
Oh

(10) Patent No.: US 9,829,994 B2
(45) Date of Patent: Nov. 28, 2017

(54) CHARACTER INPUT DEVICE

(76) Inventor: Eui Jin Oh, Daejeon (KR)

(*) Notice: Subject to any disclaimer, the term of this patent is extended or adjusted under 35 U.S.C. 154(b) by 587 days.

(21) Appl. No.: 12/682,083

(22) PCT Filed: Oct. 13, 2008

(86) PCT No.: PCT/KR2008/006029
§ 371 (c)(1),
(2), (4) Date: Apr. 8, 2010

(87) PCT Pub. No.: WO2009/048310
PCT Pub. Date: Apr. 16, 2009

(65) Prior Publication Data
US 2010/0207899 A1 Aug. 19, 2010

(30) Foreign Application Priority Data
Oct. 12, 2007 (KR) .................. 10-2007-0103094

(51) Int. Cl.
*G06F 3/033* (2013.01)
*G06F 3/023* (2006.01)
(Continued)

(52) U.S. Cl.
CPC ............ *G06F 3/0234* (2013.01); *G06F 3/023* (2013.01); *G06F 3/04886* (2013.01); *H04M 1/0235* (2013.01); *H04M 2250/70* (2013.01)

(58) Field of Classification Search
CPC .... G06F 3/023; G06F 3/0234; G06F 3/04886; H04M 2250/70; H04M 1/0235;
(Continued)

(56) References Cited

U.S. PATENT DOCUMENTS 5,581,484 A * 12/1996 Prince ..................... G06F 3/014
340/407.1
5,729,249 A * 3/1998 Yasutake ............... G06F 3/0338
345/157
(Continued)

FOREIGN PATENT DOCUMENTS

CN 1592323 A 3/2005
EP 1191430 A1 3/2002
(Continued)

OTHER PUBLICATIONS

Decision to Grant, Japanese Patent Office, Oct. 1, 2013, Japanese Patent Application No. 2010-528815.

*Primary Examiner* — Vinh Lam
(74) *Attorney, Agent, or Firm* — Lex IP Meister, PLLC

(57) ABSTRACT

The present invention relates to a character input device. The character input device includes a detection unit, an input tool and a control unit. The detection unit detects one or more input forms of vertical pressing horizontal pressing tilting pressing, contact, and contact movement. The input tool enables directional input corresponding to each input form detectable by the detection unit to be performed. The control unit generates a plurality of direction indication locations corresponding to directional inputs performed by the input tool, and extracts data, assigned to a direction indication location corresponding to detected directional input, from a memory unit and inputting the extracted data when directional input of the input tool corresponding to any one of the direction indication locations is detected by the detection unit.

19 Claims, 11 Drawing Sheets

(51) Int. Cl.
*G06F 3/0488* (2013.01)
*H04M 1/02* (2006.01)

(58) Field of Classification Search
CPC .......... H04M 2250/22; G01C 21/3664; H04N
1/32058; G05B 2219/23044; G05B
2219/23377; G05B 2219/23378; G05B
2219/36168; G05B 2219/39137; G05B
2219/40065; G02F 1/13338
USPC .................... 345/173, 184; 178/18.01–20.04
See application file for complete search history.

(56) References Cited

U.S. PATENT DOCUMENTS

| | | | |
|---|---|---|---|
| 6,009,338 A | 12/1999 | Iwata | |
| 6,208,328 B1 * | 3/2001 | Kawachiya | G05G 9/047 345/157 |
| 6,300,938 B1 * | 10/2001 | Culver | G06F 3/0362 345/156 |
| 6,940,495 B2 * | 9/2005 | Morimoto | G06F 3/0338 178/18.06 |
| 7,102,626 B2 * | 9/2006 | Denny, III | G06F 1/1626 345/179 |
| 7,286,119 B2 * | 10/2007 | Yamaguchi | G06F 3/04815 345/156 |
| 7,388,578 B2 * | 6/2008 | Tao | 345/173 |
| RE40,891 E * | 9/2009 | Yasutake | G06F 3/0338 178/18.01 |
| 7,679,011 B2 * | 3/2010 | Chang | 200/6 A |
| 7,889,174 B2 * | 2/2011 | Culver | G06F 3/016 345/156 |
| 8,405,618 B2 * | 3/2013 | Colgate | G06F 3/016 341/22 |
| 2002/0067346 A1 | 6/2002 | Mouton | |
| 2006/0005131 A1 * | 1/2006 | Tao | G06F 1/1624 715/702 |
| 2007/0070045 A1 * | 3/2007 | Sung et al. | G06K 9/222 345/173 |
| 2008/0042982 A1 * | 2/2008 | Gates | G06F 3/03543 345/173 |
| 2008/0238879 A1 * | 10/2008 | Jaeger et al. | 345/173 |
| 2010/0295812 A1 * | 11/2010 | Burns | G06F 3/0412 345/174 |
| 2010/0302171 A1 * | 12/2010 | Yoshida | A63F 13/02 345/173 |
| 2011/0032203 A1 * | 2/2011 | Pryor | 345/173 |
| 2014/0139455 A1 * | 5/2014 | Argiro | A63F 13/02 345/173 |
| 2015/0220197 A1 * | 8/2015 | Algreatly | G06F 3/0414 345/173 |

FOREIGN PATENT DOCUMENTS

| | | | | |
|---|---|---|---|---|
| JP | 11-224161 | | 8/1999 | |
| JP | 11-259230 | | 9/1999 | |
| JP | H11 259230 | * | 9/1999 | ............ G06F 3/033 |
| JP | 2008-507011 | | 3/2008 | |
| JP | 2009-516260 | | 4/2009 | |
| KR | 10-2003-0030563 | | 4/2003 | |
| KR | 10-2005-0077507 | | 8/2005 | |
| KR | 10-2006-0119527 | | 11/2006 | |
| KR | 10-2007-0039116 | | 4/2007 | |
| WO | 2006/005993 A2 | | 1/2006 | |
| WO | 2007-055532 | | 5/2007 | |

* cited by examiner

CHARACTER INPUT DEVICE

TECHNICAL FIELD

The present invention relates, in general, to a character input device, and, more particularly, to a character input device, which does not require a fixed space in which an input unit is installed, thus minimizing the entire size of a terminal or maximizing the size of a touch screen, and enabling accurate and prompt input compared to input performed using a finger on a touch screen.

BACKGROUND ART

Recently, with the rapid development of software, semiconductor technology and information processing technology, various information devices such as mobile phones or Personal Digital Assistants (PDAs) are gradually becoming small and realizing multifunctionality, and together with this, the importance of information storage and communication using the input of characters or the like in such an information device is gradually increasing.

However, an input device for various characters or commands in an information device that is currently being used still has too many problems to suitably cope with the above-described variation in an information environment.

That is, the most important thing in the input of characters is to promptly and accurately input desired information, and, for this operation, it is most preferable to accurately input characters using a minimum number of manipulations.

For this input operation, the most preferable input device is a structure in which separate input keys are set for respective characters, but this device is actually inefficient because more than 100 input keys, including keys for 24 phonemes for the Korean alphabet, 26 phonemes for the English alphabet, 10 numerals, and various types of symbols, are required.

Meanwhile, various types of functions, such as Moving Picture Experts Group Layer (MP3), Digital Multimedia Broadcasting (DMB), and a video call, in addition to a basic function such as a phone call, have been continuously added to recent portable mobile communication terminals.

However, in the actual condition, a wider screen and a larger input device are required to efficiently implement such complicated functions, whereas the entire size of a terminal is gradually becoming smaller.

Meanwhile, when characters are input using the above-described touch screen-type terminal, a method of inputting relevant characters by dividing part of a touch screen as an input area, by arranging a plurality of input keys in the input area and by touching the respective input keys has been used.

Such a conventional touch screen-type terminal is inconvenient in that it is impossible to arrange a plurality of input keys in the input area due to spatial restrictions.

Further, the conventional touch screen-type terminal is problematic in that, since input keys for character input must be arranged in the input area, the size of the screen is inevitably reduced.

Furthermore, in order to input characters, symbols or numerals desired to be input by a user, a method of touching respective input keys arranged on the screen is performed. However, there are problems in that since, during this procedure, the case where keys other than keys desired by the user are manipulated frequently occurs, erroneous operations occur, and in that, since respective input keys must be manipulated several times to obtain the user's desired information, an input method is complicated, and the time required for character input is increased.

DISCLOSURE OF INVENTION

Technical Problem

Accordingly, the present invention has been made keeping in mind the above problems occurring in the prior art, and an object of the present invention is to provide a character input device, which does not require a fixed space in which an input unit is installed, thus minimizing the entire size of a terminal or maximizing the size of a touch screen, and enabling accurate and prompt input compared to input performed using a finger on a touch screen.

Technical Solution

In order to accomplish the above object, the present invention provides a character input device, comprising a detection unit for detecting one or more input forms of vertical pressing horizontal pressing tilting pressing contact, and contact movement; an input tool for enabling directional input corresponding to each input form detectable by the detection unit to be performed; and a control unit for generating a plurality of direction indication locations corresponding to directional inputs performed by the input tool, and extracting data, assigned to a direction indication location corresponding to detected directional input, from a memory unit and inputting the extracted data when directional input of the input tool corresponding to any one of the direction indication locations is detected by the detection unit.

The detection unit detects contact and contact movement; the input tool is provided such that one or more portions thereof can selectively come into contact with the detection unit; and the control unit generates one or more of a plurality of first direction indication locations and second direction indication locations on a basis of a portion of the input tool coming into contact with the detection unit, detects first directional input, which is performed in such a way that the input tool is moved to any one of the first direction indication locations while coming into contact with the detection unit, in response to a detection signal output from the detection unit, detects second directional input, which is performed in such a way that another portion of the input tool comes into contact with any one of the second direction indication locations on the detection unit, in response to a detection signal output from the detection unit, extracts data assigned to the first direction indication location or the second direction indication location from the control unit, and inputs the extracted data.

The input tool is configured to come into contact with the detection unit outside the second direction indication locations while all or part of the input tool is tilted; and the control unit generates a plurality of third direction indication locations outside the second direction indication locations on a basis of the portion of the input tool coming into contact with the detection unit, detects third directional input, which is performed in such a way that the input tool comes into contact with any one of the third direction indication locations on the detection unit, in response to a detection signal output from the detection unit, extracts data assigned to the third direction indication location from the control unit, and inputs the extracted data.

The input tool comprises a plate-shaped first input unit, a projection element configured to project from the first input unit to be elastically deformable, so that the projection element is fixed to the detection unit or so that the projection element is provided with a non-slip element on its front portion and comes into contact with the detection unit through the non-slip element, and a second input unit formed to protrude from a middle of the projection element in parallel with the first input unit at a length shorter than that of the first input unit, thus coming into contact with the detection unit through elastic deformation of the projection element during movement of the first input unit.

The first directional input is performed through multi-stage input implemented in two or more stages, according to a movement distance of the input tool.

The input tool comprises a plate-shaped input unit, a central contact element formed at a center of the input unit and configured to perform central input while coming into contact with the detection unit through pressing of the input unit and perform first directional input by moving to a first direction indication location while the central contact element comes into contact with the detection, and a second direction contact element formed at a location, corresponding to the second direction indication locations, on an outer circumferential portion of the input unit and configured to perform second directional input while coming into contact with the detection unit through pressing of the input unit.

The input tool comprises a plate-shaped input unit made of elastically deformable material, a support contact element formed in a cylindrical shape, and a central contact element formed inside the support contact element at a center of the input unit to have a length shorter than that of the support contact element and configured to perform central input while coming into contact with the detection unit through elastic deformation of the input unit when the input unit is pressed in a state in which the support contact element comes into contact with the detection unit and to perform first directional input by moving to a first direction indication location while the central contact element comes into contact with the detection unit; and the second directional input is performed in such a way that an outer circumferential portion of the input unit is pressed and the input unit comes into contact with the detection unit.

The input unit is formed such that a top thereof has a convex spherical shape; and the input tool further comprises a third direction contact element provided on the top of the input unit and configured to perform third directional input while sliding along the input unit and coming into contact with the detection unit through pressing applied in a direction of inclination.

The input tool comprises a plate-shaped input unit made of elastically deformable material, a support contact element formed in a cylindrical shape on an outer circumferential portion of the input unit, a central contact element formed at a center of the input unit to have a length shorter than that of the support contact element and configured to perform central input while coming into contact with the detection unit through elastic deformation of the input unit when the input unit is pressed in a state in which the support contact element comes into contact with the detection unit and to perform first directional input by moving to a first direction indication location while the central contact element comes into contact with the detection unit, and a second direction contact element formed inside the support contact element to correspond to the second direction indication locations and configured to perform second directional input while coming into contact with the detection through elastic deformation of the input unit.

The input tool comprises a plate-shaped input unit, a central contact element formed on a bottom of the input unit in a cylindrical shape, and a plurality of second direction contact elements formed outside the central contact element to protrude toward the detection unit at different lengths; and the second direction contact elements sequentially come into contact with the detection unit according to a tilting degree of the input unit at a time of performing second directional input, thus enabling multi-stage input to be performed in two or more stages.

The input unit comprises an elastically deformable connection element connected to a case which accommodates the detection unit so that the input unit enables contact, contact movement or tilting to be performed with respect to the detection unit.

The connection element comprises: a main body connected to the case; and an elastic connection part formed to be elastically deformable and configured to connect the input unit to the main body.

The main body is formed in a bar shape and both ends thereof are bent in a '⊂' shape, so that the main body is supported to be slidably movable on the case in order to allow the input unit to become close to or far from the detection unit.

The main body comprises a hinge part disposed between the case and the main body and configured to enable the input unit to be put on the detection unit in such a way that the main body is rotated with respect to the case through the hinge part.

The control unit automatically switches a mode to a character input mode when the detection unit comes into contact with the input tool.

The control unit generates a keyboard display unit for displaying characters, which can be input through respective directional inputs, around the input tool when the mode is switched to the character input mode.

The detection unit is a touch screen.

The detection unit is provided on a portion of a paper Liquid Crystal Display (LCD)(E-Paper LCD) that can be folded or rolled.

Meanwhile, the detection unit detects horizontal pressing vertical pressing and contact; the input tool is provided to horizontally and vertically press a portion of the detection unit; and the control unit generates a plurality of fourth direction indication locations and fifth direction indication locations on a basis of a portion in which the input tool comes into contact with the detection unit, detects fourth directional input, which is performed in such a way that the input tool vertically presses any one of the fourth direction indication locations, in response to a detection signal output from the detection unit, extracts data assigned to the fourth direction indication location from the memory unit, inputs the extracted data, detects fifth directional input, which is performed in such a way that the input tool horizontally presses any one of the fifth direction indication locations, in response to a detection signal output from the detection unit, extracts data assigned to the fifth direction indication location from the memory unit, and inputs the extracted data.

The detection unit is a touch screen provided with a tactile sensor.

The input tool is formed in a disk shape.

Advantageous Effects

According to the character input device of the present invention, there is an advantage in that it does not require a fixed space in which an input unit is installed, thus minimizing the entire size of a terminal or maximizing the size of a touch screen, and enabling accurate and prompt input compared to input performed using a finger on a touch screen.

MODE FOR THE INVENTION

Hereinafter, embodiments of the present invention will be described in detail with reference to the attached drawings.

Figure 1:
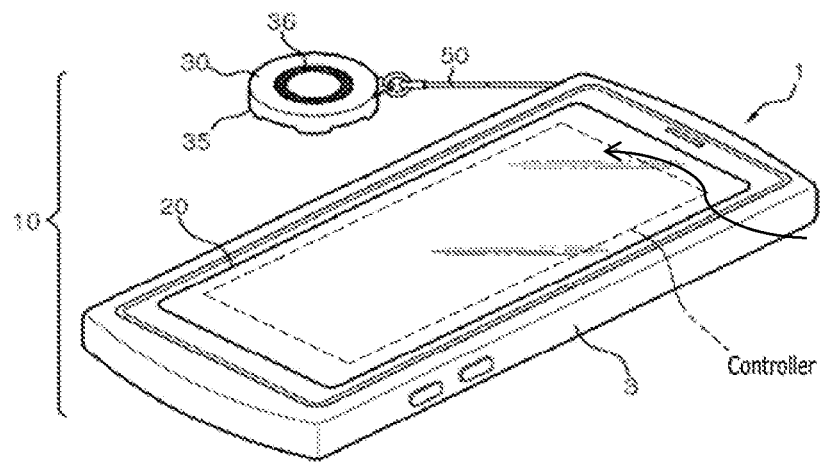
FIG. 1 is a perspective view showing a portable mobile communication terminal equipped with a character input device according to an embodiment of the present invention.

FIG. 1 is a perspective view of a portable mobile communication terminal equipped with a character input device according to an embodiment of the present invention.

Referring to the drawing a character input device 10 according to the present invention includes a detection unit 20 for detecting contact or contact movement, an input tool 30 provided to selectively bring one or more locations into contact with the detection unit 20, and a control unit (not shown) for generating one or more of a plurality of first direction indication locations M1, M2, M3, and M4 and a plurality of second direction indication locations P1, P2, P3 and P4 on the basis of one portion of the input tool 30 coming into contact with the detection unit 20, detecting first directional input M, which is performed in such a way that the input tool 30 moves to any one of the first direction indication locations while coming into contact with the detection unit 20, in response to a detection signal output from the detection unit 20, or detecting second directional input P, which is performed in such a way that another location of the input tool 30 comes into contact with any one of the second direction indication locations on the detection unit 20, in response to a detection signal output from the detection unit 20, extracting data assigned to the first direction indication location or the second direction indication location from a memory unit (not shown), and inputting the extracted data.

A portable mobile communication terminal 1 is implemented using a touch screen method. Therefore, the detection unit 20 may be implemented as a touch screen.

The input tool 30 is configured to perform first directional input M which is performed by moving to any one of the first direction indication locations while coming into contact with the detection unit 20, and second directional input P which is performed by bringing another portion of the input tool 30 into contact with any one of the second direction indication locations while one portion of the input tool 30 comes into contact with the detection unit 20.

Further, a keyboard display unit (not shown) for displaying a character keyboard may be provided around the input tool 30. The keyboard display unit preferably appears around the input tool 30. When the location of the input tool 30 is changed, the keyboard display unit is also moved along with the input tool 30.

Meanwhile, the control unit generates the plurality of first direction indication locations and second direction indication locations which are radially arranged around a portion in which the input tool 30 comes into contact with the detection unit 20. Therefore, the first direction indication locations and the second direction indication locations are not designated as specific locations on the detection unit 20, and are determined by contact with the input tool 30 in a character input mode.

That is, since the control unit stores in advance data about predetermined contact forms (for example, the sectional shape of a contact part) detected when the input tool 30 is put on the detection unit 20, the control unit can generate the first direction indication locations and the second direction indication locations to correspond to the input tool 30, and can switch a mode to a character input mode and reveal a character keyboard when a predetermined contact form is detected while the input tool 30 is put on the detection unit 20.

Further, the control unit may additionally generate a reference location S which is a reference for the generation of the first and second direction indication locations. The reference location S is disposed at the center of the first and second direction indication locations that are radially arranged.

Furthermore, the control unit may be provided to process only one of first directional input M and second directional input P. Therefore, when the control unit is designated to process only first directional input M, only the first directional input M using contact movement is possible through the input tool 30.

The number of first direction indication locations and the number of second direction indication locations may be variously set. That is, the numbers of first and second directional indication locations may be set as four, respectively, as in the case of the present embodiment, but may also be eight. According to the circumstances, the numbers of first and second directional indication locations may be expanded or reduced.

Further, a first character $M1_1$ and a second character $M1_2$ that are input at the time of directional input may be assigned together to each of the direction indication locations M1, M2, M3, M4, P1, P2, P3, and P4.

The first character $M1_1$ is a character assigned to be input through the contact or contact movement of the input tool 30 with or on the detection unit 20 when first directional input M or the second directional input P is performed on each of the direction indication locations M1, M2, M3, M4, P1, P2, P3, and P4.

The second character $M1_2$ is a character assigned to be input when character input is performed by two-stage movement according to the movement distances to respective direction indication locations M1, M2, M3 and M4 at the time of first directional input M, or when the input tool 30 sequentially comes into contact with the detection unit 20 at respective direction indication locations P1, P2, P3 and P4 according to the tilting degree of the input tool 30 and second directional input P is performed in two stages at the time of second directional input P.

Meanwhile, in the above description, it is considered that a character input mode is executed when the input tool 30 is put on the detection unit 20, and, at this time, the first direction indication locations and the second direction indication locations are generated on the basis of a portion of the detection unit 20 in which the input tool 30 is put on and comes into contact with the detection unit 20. However, a reference input unit (not shown) may be provided at a predetermined location on the detection unit 20. The reference input unit is a reference for the contact or contact movement of the input tool 30, and is configured to allow the control unit to determine the relative location, contact or contact movement of the input tool 30.

Such a reference input unit may be provided to be fixed on a portion of the detection unit 20, or to be movable through dragging.

In this case, the reference input unit is located in a standby area (not shown) formed on one side of the detection unit 20 in a mode other than the character input mode. When the mode is switched to the character input mode, a user may drag the reference input unit, located in the standby area, into the detection unit 20 and may input a character.

Due thereto, the user can freely select the location of the reference input unit required for character input, thus increasing the user's convenience.

Figure 2:
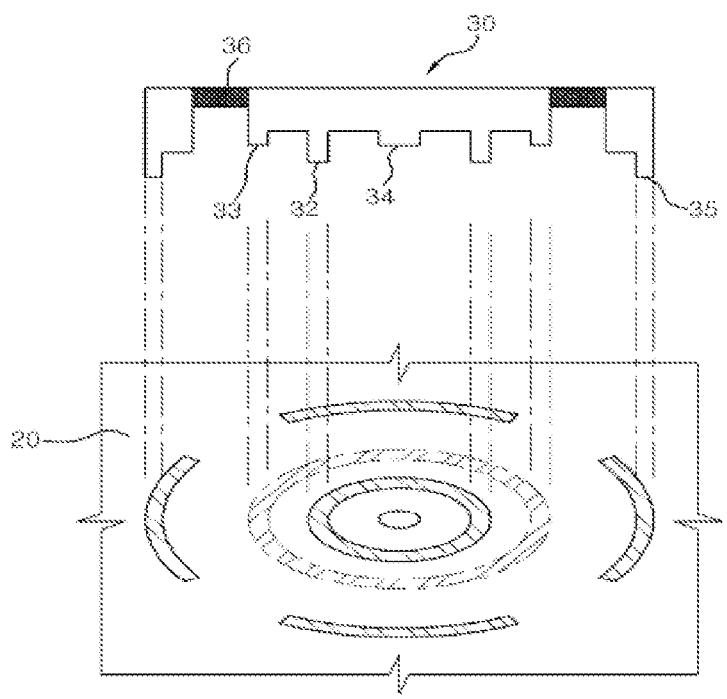
FIG. 2 is a sectional view of an input tool according to an embodiment of the present invention.

FIG. 2 is a sectional view of an input tool according to an embodiment of the present invention.

Referring to the drawing the input tool 30 may be implemented as an input unit 31 having a disk shape, or as one of other input units having various shapes, such as a diamond and a hexahedron.

The input unit 31 is provided to have a plate shape and perform movement input. In the circumferential portion thereof, an inward-second direction contact element 32 and an outward-second direction contact element 33, which are formed to protrude toward the detection unit 20 at different lengths so that multi-stage input is possible in two stages in preparation for the performance of second directional input P, may be provided.

The inward-second direction contact element 32 is formed to protrude longer than the outward-second direction contact element 33 and configured to sequentially come into contact with the detection unit 20 through the pressing of the input tool 30 from a portion above the input tool. Of course, it is possible that the inward-second direction contact element 32 may be formed to protrude shorter than the outward-second direction contact element 33.

The inward-second direction contact element 32 and the outward-second direction contact element 33 are made of elastic material, so that elasticity occurs according to the tilting degree of the input unit 31 when they come into contact with the detection unit 20 through the input manipulation of the user at the time of performing second directional input P, thus enabling multi-stage input to be performed in two stages.

In this case, multi-stage input is performed in such a way that the inward-second direction contact element 32 comes into contact with the detection unit 20 when first-stage second directional input is performed through the tilting of the input unit 31, and the outward-second direction contact element 33 comes into contact with the detection unit 20 when the second-stage second directional input P is performed through the sequential tilting of the input unit 31.

At the center of the inward-second direction contact element 32, that is, the location corresponding to the reference location S, a central contact element 34 is provided. The central contact element 34 comes into contact with the detection unit 20 through pressing from a portion above the central contact element 34, so that center input C other than the first directional input M and the second directional input P is performed. The center input C may be provided so that characters other than characters input at the time of the first directional input M and the second directional input P may be input, or so that the types of characters input by the first directional input M and the second directional input P can be changed. Changing the types of characters may mean the switching of an input mode, such as switching from Korean to English or switching from English to Japanese.

Alternatively, first directional input M may be performed by the central contact element 34. That is, the central contact element 34 is moved to any one of the first direction indication locations while coming into contact with the detection unit 20, so that first directional input M can be performed.

A support contact element 35 is provided outside the outward-second direction contact element 33, that is, on the outer circumferential portion of the input tool 30. The support contact element 35 is configured such that, when the input tool 30 is put on the detection unit 20, the support contact element 35 comes into contact with the detection unit 20, thus adjusting the horizontal position the input tool 30. While the support contact element 35 comes into contact with the detection unit 20, the central contact element 34, the inward-second direction contact element 32, and the outward-second direction contact element 33 are spaced apart from the detection unit 20.

The support contact element 35 may be formed in various shapes, for example, a shape corresponding to the shape of the input tool 30 when the input tool 30 is formed in the shape of a diamond, a hexahedron, etc.

Further, the control unit switches a mode to a character input mode in response to a detection signal output from the detection unit 20 which detects the contact of the support contact element 35 with the detection unit 20 when the input tool 30 is put on the detection unit 20.

Further, the control unit sets the first direction indication locations and the second direction indication locations on the basis of the location of the support contact element 35. This operation is possible because data about the shape of the input tool 30, that is, the size of the support contact element 35 and contact forms or contact shapes corresponding to the locations of the central contact element 34, the inward-second direction contact element 32 and the outward-second direction contact element 33, is stored in the memory unit in advance, and the control unit automatically switches a mode to a character input mode and sets the first direction indication locations and the second direction indication locations to correspond to the input tool 30 when the grounding form or contact shape of the input tool 30 is identical to a contact shape previously stored in the memory unit.

Furthermore, first directional input M may be performed in such a way that the support contact element 35 moves to any one of the first direction indication locations while coming into contact with the detection unit 20, or in such a way that the central contact element 34 moves to any one of the first direction indication locations while coming into contact with the detection unit 20.

A return element 36 is disposed between the input unit 31 and the support contact element 35.

The return element 36 may be made of various materials, for example, an elastic material, so that the input tool 30 may return to an initial state after directional input is performed.

When the input tool 30 is put on the detection unit 20, a predetermined grounding form (for example, grounding between the detection unit 20 and the support contact element 35) is detected, and the control unit may automatically switch a mode to a character input mode when the detected grounding form or contact shape is identical to the contact shape previously stored in the memory unit.

The contact shape may be variously provided, for example, a circular shape, a rectangular shape, a diamond shape, etc. without being limited to specific shapes.

In this case, the detection unit 20 is preferably implemented as a multi-touch screen applied to iPhone (product name) or the like capable of detecting a plurality of contacts.

The input tool 30 may be connected to a case 3, which accommodates the detection unit 20, through a connection element 50.

As shown in FIG. 1, the connection element 50 may be provided as a string and may be variously provided as a loop, a copper wire, etc.

One end of a connection element 50 is connected to the case 3 and the other end is connected to the input tool 30, so that the input tool 30 is not removed from the case 3 even when character input is not performed, thus preventing the risk of the loss of the input tool 30.

When character input is performed using the character input device 10 equipped with the input tool 30 connected in the shape of a loop according to the present invention, the input tool 30 can be put on the detection unit 20 through the input operation of the user.

Further, the connection element 50 is preferably made of an elastically deformable material so that contact with or contact movement on the detection unit 20 while the input tool 30 is freely moved.

Figure 3:
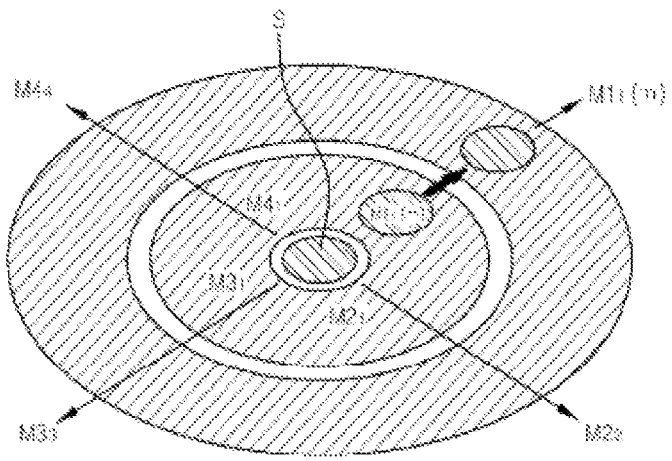
FIG. 3 is a view showing the state in which multi-stage input is performed in two stages at the time of performing first directional input according to an embodiment of the present invention.

FIG. 3 is a view showing the state in which multi-stage input is performed in two stages at the time of performing first directional input according to an embodiment of the present invention.

Referring to FIG. 3, a plurality of first direction indication locations M1, M2, M3 and M4 is radially arranged around the reference location S.

The respective first direction indication locations M1, M2, M3 and M4 are preferably spaced apart from the reference location S at regular intervals and are preferably arranged at regular angles therebetween.

The number of first direction indication locations M1, M2, M3 and M4 may be variously set. For example, the number of first direction indication locations may be four, as shown in FIG. 3, or may be eight or twelve according to the design or usage environment.

At the time of first directional input M, when the user desires to input, for example, a first character $M1_1(\neg)$ assigned to the first direction indication location M1, the input tool 30 is moved from the reference location S to the first direction indication location M1 close to the reference location S, and first-stage movement input is performed.

At this time, the control unit extracts the first character $M1_1(\neg)$, desired by the user and assigned to the first direction indication location M1, from the memory unit and inputs the extracted character.

The control unit can automatically switch a mode to a character input mode at the time of inputting a character.

Further, when a second character $M1_2(\neg\neg)$, additionally assigned to the first direction indication location M1 is desired to be input, the second character $M1_2(\neg\neg)$ can be input through multi-stage input in which the input tool 30 is moved farther from the reference location S on the first direction indication location M1 to perform input.

Figure 4:
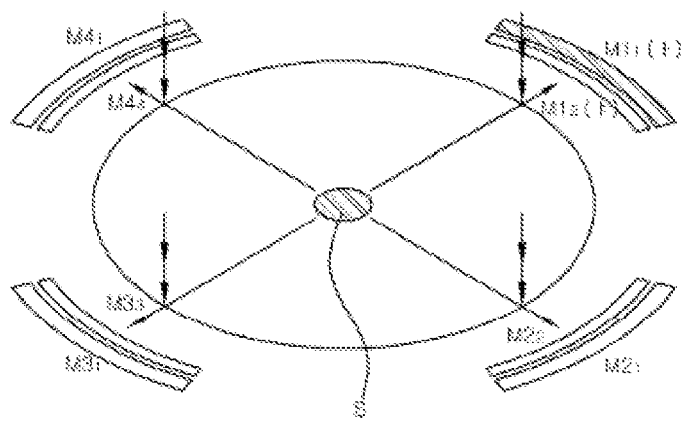
FIG. 4 is a view showing the state in which multi-stage input is performed in two stages at the time of performing second directional input according to an embodiment of the present invention.

FIG. 4 is a view showing the state in which multi-stage input is performed in two stages at the time of performing second directional input according to an embodiment of the present invention. Referring to FIG. 4, the construction of the second direction indication locations P1, P2, P3 and P4 is identical or similar to that of the first direction indication locations M1, M2, M3 and M4 of FIG. 3, and thus a detailed description thereof is omitted.

At the time of performing second directional input P, when the user desires to input, for example, a first character $P1_1(\vdash)$ assigned to the second direction indication location P1, one portion of the input tool 30 is pressed or tilted toward the second direction indication location P1.

At this time, as shown in the slashed portion of FIG. 4, the inward-second direction contact element 32, protruding longer, comes into contact with the detection unit 20, and the control unit can extract the first character $P1_1(\vdash)$ assigned to the second direction indication location P1 from the memory unit and can input the first character.

Further, when a second character $P1_2(\vdash)$ additionally assigned to the second direction indication location P1 is desired to be input, the outward-second direction contact element 33 having a shorter length comes into contact with the detection unit 20 through multi-stage input in which input is performed by further tilting the input tool 30 toward the second direction indication location P1. Accordingly, the control unit extracts the second character $P1_2(\vdash)$ additionally assigned to the second direction indication location P1 from the memory unit, and inputs the second character.

The first directional input M and the second directional input P may be independently performed or may be simultaneously performed.

Figure 5:
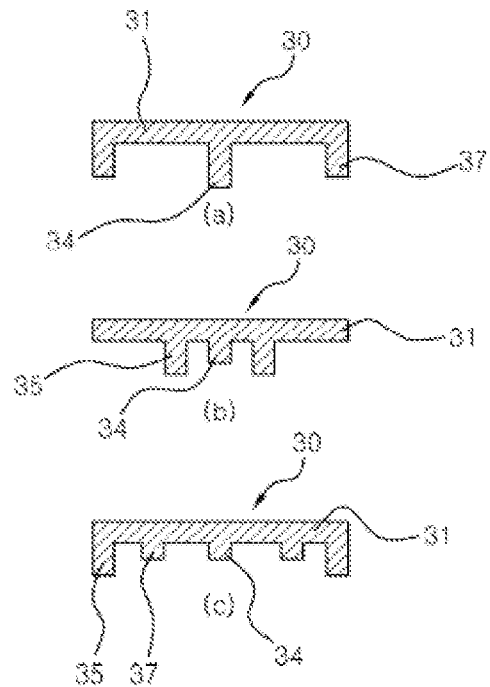
FIG. 5 is a sectional view of an input tool according to another embodiment of the present invention.

FIG. 5 is a sectional view of an input tool according to another embodiment of the present invention.

As shown in FIG. 5(a), the input tool 30 includes a plate-shaped input unit 31, a central contact element 34 formed to protrude from the center of the input tool, and a second direction contact element 37 formed to protrude from a location, corresponding to the second direction indication locations, on the outer circumferential portion of the input unit 31. At this time, the central contact element 34 is configured to perform central input C while coming into contact with the detection unit 20 through pressing on the center of the input unit 31, and to perform first directional input M by moving to a first direction indication location while coming into contact with the detection unit 20.

Further, the second direction contact element 37 is formed at the location, corresponding to the second direction indication locations, on the outer circumferential portion of the input unit 31, and is configured to perform second directional input P while coming into contact with the detection unit 20 through pressing on the input unit 31.

In FIG. 5(a), the central contact element 34 is formed to be longer than the second direction contact element 37, but the opposite case is possible.

Meanwhile, the input tool 30 of FIG. 5(a) cannot perform central input C through the central contact element 34 if the central contact element 34 of the input tool 30 is initially in contact with the detection unit 20 in the character input mode. Therefore, in order to enable the performance of the central input C, the input tool 30 is preferably placed to be spaced apart from the detection unit 20. At this time, the control unit detects that an element for supporting the input tool 30 to be spaced apart from the detection unit 20 (refer to a connection element 50 shown in FIGS. 6 to 10) is moving to the detection unit 20, and thus can switch a mode to the character input mode.

Next, the input tool 30 shown in FIG. 5(b) includes an input unit 31, a support contact element 35 and a central contact element 34. The input unit 31 is formed in the shape of a plate, and is made of an elastically deformable material.

Further, the support contact element 35 is formed to protrude from the bottom of the input unit 31 in a cylindrical shape, so that, when the input tool 30 is put on the detection unit 20, the support contact element 35 comes into contact with the detection unit 20. The central contact element 34 is formed inside the support contact element 35 at the center of the input unit 31 to have a length shorter than that of the support contact element 35. Further, when the input unit 31 is pressed while the support contact element 35 comes into contact with the detection unit 20, the central contact element 34 comes into contact with the detection unit 20 through the elastic deformation of the input unit 31, and thus central input C can be performed. Further, the central contact element 34 is moved to a first direction indication location while coming into contact with the detection unit 20, and thus first directional input M can be performed.

When central input C is not required, the central contact element 34 may be omitted. In this case, since the support contact element 35 is in contact with the detection unit 20, the support contact element 35 is moved to the first direction indication location in a contact state, and thus first directional input M may be performed.

Meanwhile, as shown in FIG. 5(c), the input tool 30 may include an input unit 31, a support contact element 35, a central contact element 34, and a second direction contact element 37. The input unit 31 is formed in the shape of a plate and is made of elastically deformable material.

Further, the support contact element 35 is formed to protrude from the outer circumferential portion of the input unit 31 in a cylindrical shape. When the input tool 30 is put on the detection unit 20, the support contact element 35 comes into contact with the detection unit 20, and thus supports the input unit 31.

Further, the central contact element 34 is formed at the center of the input unit 31 to have a length shorter than that of the support contact element 35. When the center of the input unit 31 is pressed while the support contact element 35 comes into contact with the detection unit 20, the central contact element 34 comes with the detection unit 20 through the elastic deformation of the input unit 31, and thus central input C is performed. When the central contact element 34 is moved to a first direction indication location while coming into contact with the detection unit 20, first directional input M is performed.

In the character input device according to the present embodiment, the central contact element 34 may be omitted when central input C is not required. In this case, first directional input M may be performed in such a way that the support contact element 35 is moved to any one of the first direction indication locations while coming into contact with the detection unit 20.

Furthermore, the second direction contact element 37 is formed inside the support contact element 35 to correspond to the second direction indication locations, and is thus configured to perform second directional input P while coming into contact with the detection unit 20 through the elastic deformation of the input unit 31. Therefore, the second direction contact element 37 protrudes to have a length shorter than that of the support contact element 35 so that it can selectively come into contact with the detection unit 20.

Figure 6:
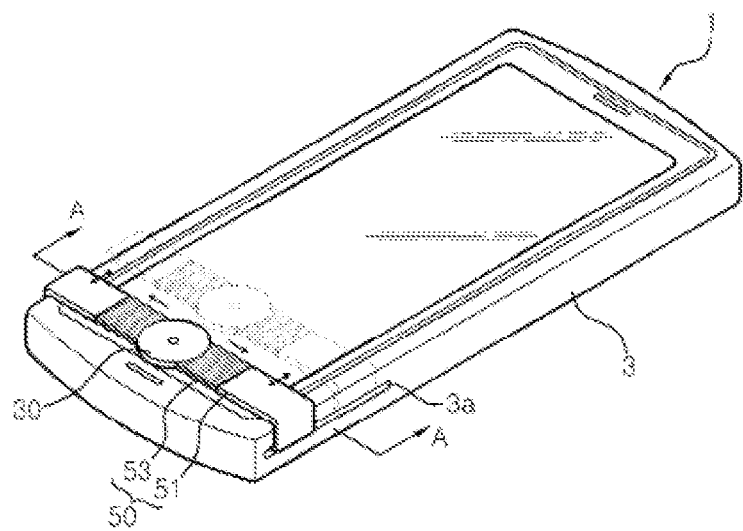
FIG. 6 is a perspective view of a portable mobile communication terminal equipped with a character input device according to another embodiment of the present invention.
Figure 7:
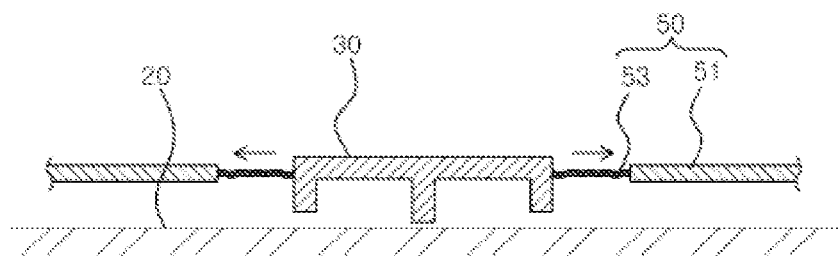
FIG. 7 is a sectional view taken along line A-A of FIG. 6.

FIG. 6 is a perspective view of a portable mobile communication terminal equipped with a character input device according to another embodiment of the present invention, and FIG. 7 is a sectional view taken along line A-A of FIG. 6.

As shown in FIGS. 6 and 7, the input tool 30 is mounted on a case 3 through a connection element 50. In detail, the connection element 50 includes a main body 51 connected to the case 3 and an elastic connection part 53 configured to be elastically deformable and to connect the input tool 30 to the main body 51.

Here, the main body 51 is formed in a bar shape and both ends thereof are bent in a '⊂' shape, so that the main body 51 is provided to be guided and slidably moved along guiding portions 23a of the case 3.

Therefore, the input tool 30 can freely perform directional input while moving in a lateral direction through the elastic connection part 53 and moving in a longitudinal direction along the sliding movement of the main body 51 on the detection unit 20.

Further, when the input tool 30 is moved from a standby position (refer to the solid line of FIG. 6) located outside the detection unit 20 to the detection unit 20 (refer to the dotted line of FIG. 6), the control unit detects the sliding movement of the main body 51 and then switches a mode to the character input mode.

Figure 8:
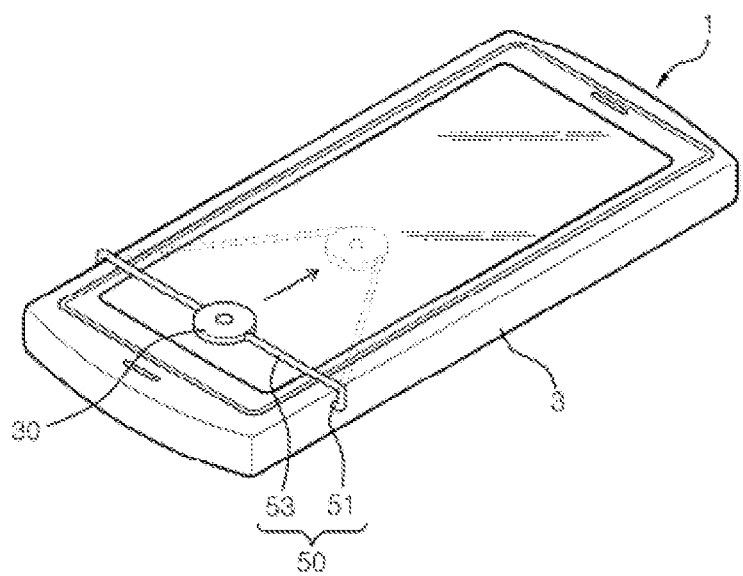
FIGS. 8 to 18 are views showing various shapes of an input tool according to the present invention.

Meanwhile, the connection element 50 may be formed in the shape of FIG. 8. That is, the connection element 50 includes a main body 51 and an elastic connection part 53, but the elastic connection part 53 is configured to be elastically deformed, as shown in FIG. 8, so that the input tool 30 can be freely located on the detection unit 20.

In this case, through the elastic connection part 53, the input tool 30 may be located on the rear surface of the terminal in a standby state, and the control unit may switch a mode to the character input mode when the input tool 30 is located on the front surface of the terminal, as shown in FIG. 8.

Figure 9:
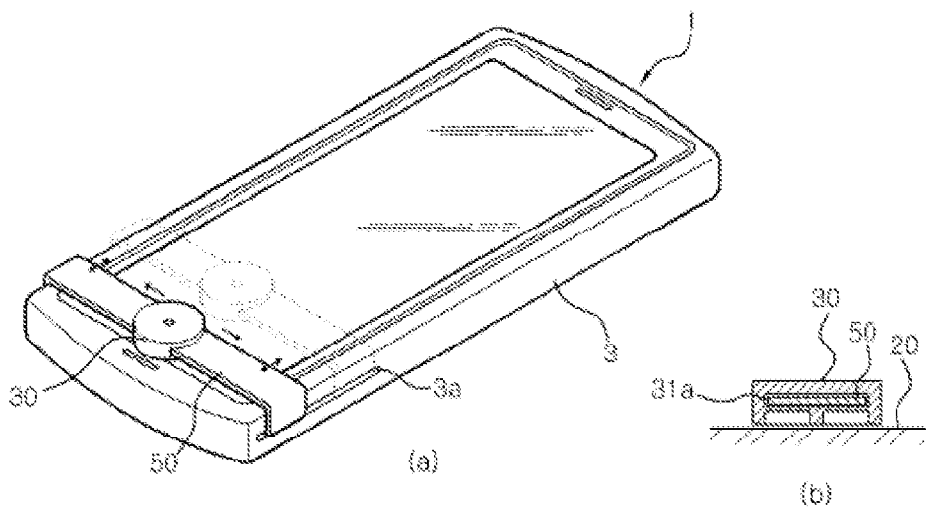

Furthermore, the connection element 50 may be formed in the shape of an elastically deformable plate, as shown in FIG. 9. At this time, in the input tool 30, a through hole 31a enabling the connection element 50 to pass therethrough is formed. The input tool 30 may be slidably moved along the connection element 50 by the through hole 31a. Further, the connection element 50 may be slidably moved on the case 3. Therefore, the input tool 30 can freely perform contact with or contact movement on the detection unit 20 while sliding along the connection element 50 in a lateral direction and moving in a longitudinal direction along with the sliding movement of the connection element 50.

Even in this case, the control unit can switch a mode to a character input mode according to the sliding movement of the connection element 50.

Figure 10:
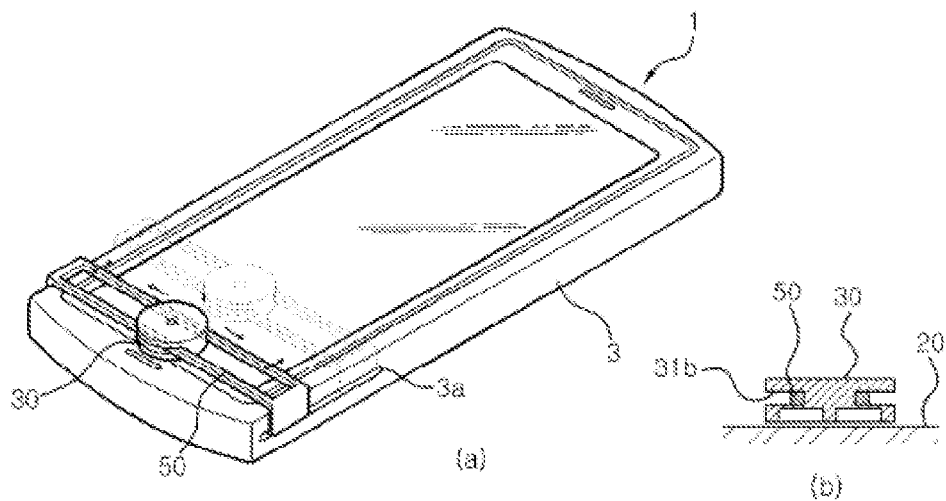
Figure 11:
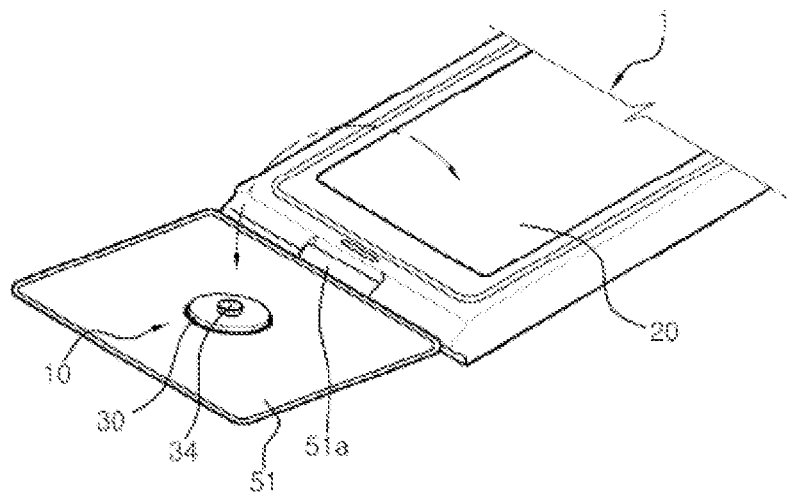

Meanwhile, the connection element 50 may be formed in the shape of a pair of elastically deformable rods, as shown in FIG. 10. In this case, cut parts 31b are formed in the input tool 30 to allow the connection element 50 to pass therethrough. The input tool 30 may be slidably moved along the connection element 50 through the cut parts 31b.

FIG. 7 is a perspective view of a portable mobile communication terminal equipped with a character input device according to a further embodiment of the present invention.

As shown in FIG. 7, a main body 51 is formed in a folder type, and thus enables directional input to be performed.

The main body 51 is provided with a hinge part 51a at a predetermined location between a case 3 and the main body 51, so that the main body 51 is rotated through the hinge part 51a with respect to a case 3, thus enabling an input tool 30 to be put on a detection unit 20.

The folder-type or bar-type main body may allow a mode to be automatically switched to a character input mode when the input tool 30 is moved (for example, when a flip is placed over the detection unit 20 or when a bar is moved), thus enabling a character keyboard to appear around the input tool 30.

In this case, the control unit stores in advance data about predetermined contact types, detected when the input tool 30 is put on the detection unit 20 (for example, the sectional shapes of a contact part). When the input tool 30 is put on the detection unit 20 and a predetermined contact form is detected, the control unit may switch a mode to a character input mode, thus enabling a character keyboard to appear.

Figure 12:
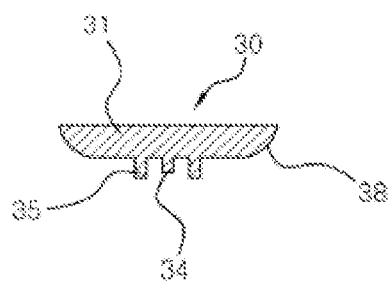

FIG. 12 is a view showing an input tool according to a further embodiment of the present invention. That is, in the input tool 30 shown in the drawing third directional input T using tilting is possible. In other words, a third directional contact element 38, which is upwardly inclined and is downwardly convex, is provided on the outer circumferential portion of the input tool 30. The third direction contact element 38 corresponds to third direction indication locations (not shown) provided outside the second direction indication locations.

Further, the input tool 30 includes a support contact element 35, and a central contact element 34 provided inside the support contact element 35, that is, at a reference location S.

Figure 13:
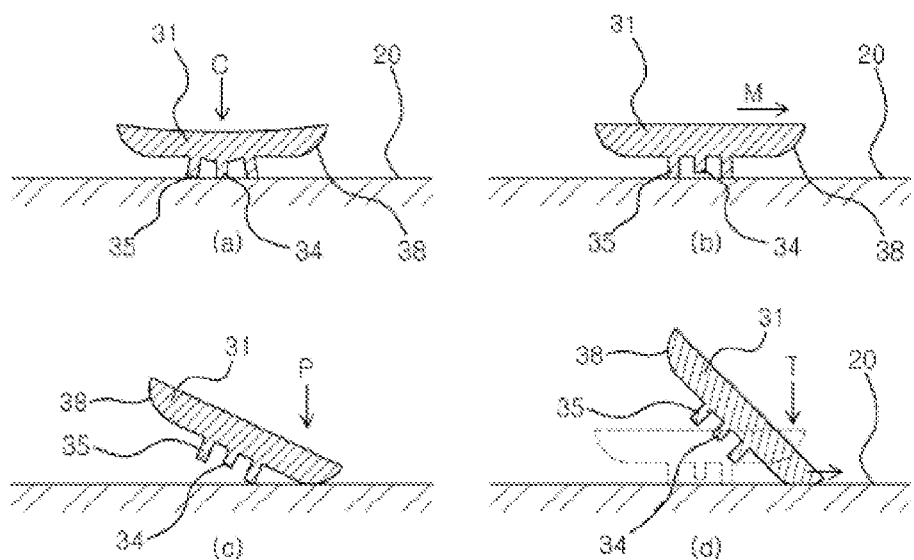

Therefore, as shown in FIG. 13(a), when the center of the input tool 30 is pressed, the central contact element 34 comes into contact with the detection unit 20 while the input tool 30 is elastically deformed, and thus central input C can be performed.

Further, as shown in FIG. 13(b), when the input tool 30 is horizontally moved toward any one of first direction indication locations while the support contact element 35 comes into contact with the detection unit 20 in the input tool 30, the control unit determines that first directional input M has been performed.

Further, as shown in FIG. 13(c), when the outer circumferential portion of the input tool 30 is pressed, the input tool 30 comes into contact with the detection unit while being tilted. At this time, the portion of the detection unit 20 coming into contact with the input tool 30 is a location designated by the control unit as a second direction indication location. Accordingly, the control unit determines that second directional input P has been performed on the relevant second direction indication location through the contact of the input tool 30.

Furthermore, as shown in FIG. 13(d), when a location of the input tool 30 corresponding to the third direction contact element 38 is pressed, the third direction contact element 38 of the input tool 30 sequentially comes into contact with the detection unit 20. At this time, the third direction contact element 38 comes into contact with the detection unit 20 from a location corresponding to the second direction indication location, but comes into contact with the detection unit in an outwardly rolling shape, and thus the control unit determines this operation to be third directional input T rather than second directional input P.

Figure 14:
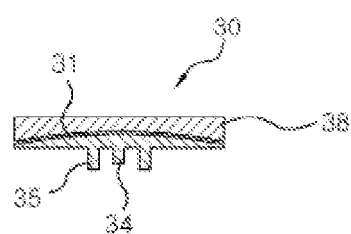

FIG. 14 is a view showing an input tool according to yet another embodiment of the present invention. That is, in FIG. 14, third directional input T is also enabled through the input tool 30.

In more detail, the input tool 30 may include a plate-shaped input unit 31 made of elastically deformable material, a support contact element 35 formed in a cylindrical shape, a central contact element 34 formed inside the support contact element 35 at the center of the input unit 31 to have a length shorter than that of the support contact element 35 and configured to perform central input C while coming into contact with the detection unit 20 through the elastic deformation of the input unit 31 when the input unit 31 is pressed in the state in which the support contact element 35 comes into contact with the detection unit 20, and to perform first directional input M by moving to a first direction indication location in the state in which the central contact element 34 comes into contact with the detection unit 20, and a third direction contact element 38 configured to slide along the input unit 31 through pressing applied in a direction of inclination from a portion above the input unit 31 and come into contact with the detection unit 20, thus performing third directional input T. Here, the input unit 31 has an upwardly convex spherical shape, and the third direction contact element 38 has an inwardly concave shape to correspond to the shape of the input unit 31.

In this case, second directional input P is performed in such a way that the outer circumferential portion of the input unit 31 is pressed and the input unit 31 comes into contact with the detection unit 20. At this time, the input tool is configured such that, if pressing is not applied to the third direction contact element 38 in the direction of inclination, the third direction contact element 38 does not slide on the input unit 31. For example, the bottom of the third direction contact element 38 may be frictionally formed, or, alternatively, a projection (not shown) may be formed on the top of the input unit 31 toward the outer portion of the third direction contact element 38.

Figure 15:
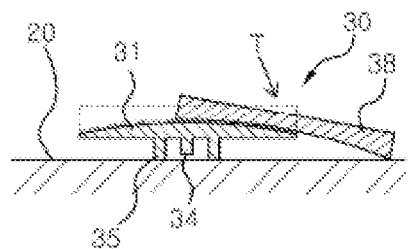

FIG. 15 is a view showing the state in which third directional input T is performed in such a way that the third direction contact element 38 comes into contact with the detection unit 20 while sliding along the input unit 31 through pressing applied in a direction of inclination.

Figure 16:
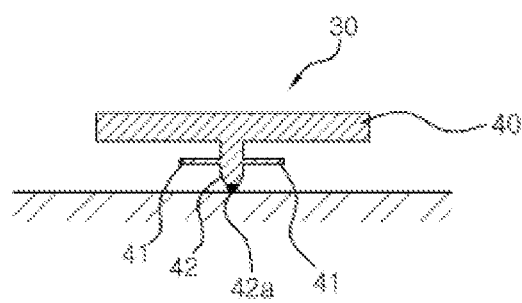

FIG. 16 is a sectional view of an input tool according to still another embodiment of the present invention. As shown in the drawing the input tool 30 includes a plate-shaped first input unit 40, a projection element 42 configured to project from the first input unit 40 to be elastically deformable, so that the projection element 42 is fixed to the detection unit 20, or so that the projection element 24 is provided with a non-slip element 42a on its front portion and comes into contact with the detection unit 20 through the non-slip element 42a, and a second input unit 41 formed to protrude from the middle of the projection element 42 in parallel with the first input unit 40 at a length shorter than that of the first input unit 40, thus coming into contact with the detection unit 20 through the elastic deformation of the projection element 42 during the movement of the first input unit 40.

This embodiment is intended to describe that first directional input M can also be performed in such a way that the second input unit 41 comes into contact with the detection unit 20 through the horizontal movement of the first input unit 40 although the case where first directional input M is performed through contact movement has been described in the above description.

Figure 17:
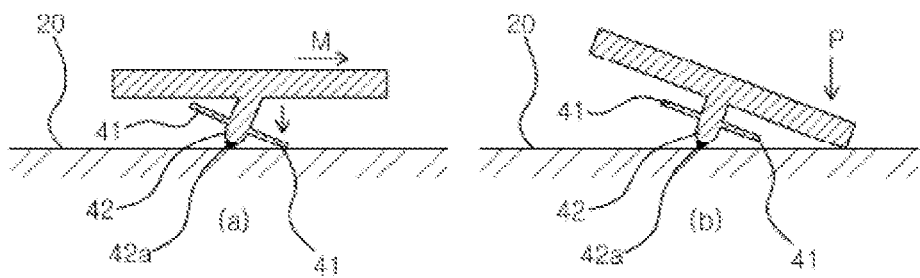

That is, as shown in FIG. 17(a), when the input tool 30 is horizontally moved, the movement of the projection element 42 on the detection unit 20 is restricted by the non-slip element 42a, and then the projection element 42 is tilted. At this time, the second input unit 41 formed in the middle of the projection element 42 is also tilted along with the tilting of the projection element 42, and then comes into contact with the detection unit 20. The control unit determines this operation to be first directional input M in response to a detection signal output from the detection unit 20, which detects the contact.

Meanwhile, as shown in FIG. 17(b), when the outer circumferential portion of the first input unit 40 is pressed, the first input unit 40 enables second directional input P to be performed while coming into contact with the detection unit 20. At this time, the second input unit 41 is formed to be shorter than the first input unit 40 so that the second input unit 41 does not come into contact with the detection unit 20 when the first input unit 40 comes into contact with the detection unit 20. Therefore, the interference of signals, occurring when the second input unit 41, together with the first input unit 40, simultaneously comes into contact with the detection 20 at the time of performing second directional input P, can be prevented.

Figure 18:
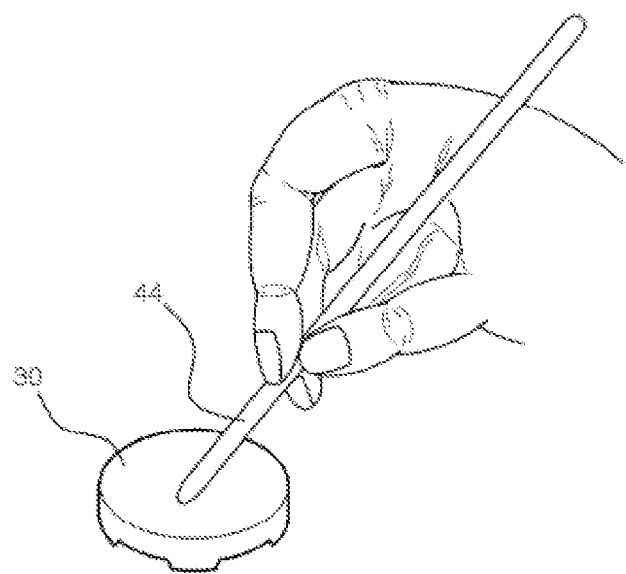

Next, FIG. 18 is a view showing an input tool according to still another embodiment of the present invention. That is, in FIG. 18, a rod-shaped grip part 43 is connected to an input tool 30. The shape of the input tool 30 may be any one of the shapes shown in FIGS. 5 (a) to (c) and the shape shown in FIG. 12.

Therefore, a user grasps the grip part 43 in his or her hand, and executes contact with or contact movement on a detection unit 20 through the input tool 30, thus enabling the above-described first, second and third directional input M, P and T to be performed.

Figure 19:
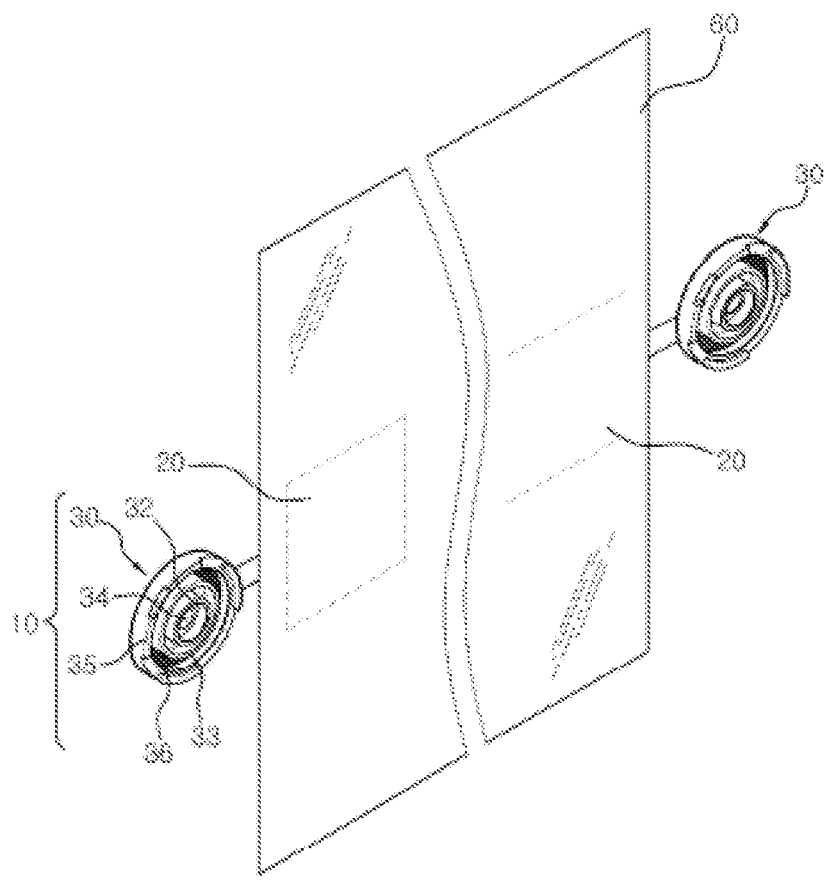
FIG. 19 is a perspective view of a paper LCD equipped with a character input device according to a further embodiment of the present invention.

FIG. 19 is a perspective view of a paper Liquid Crystal Display (LCD) equipped with a character input device according to an embodiment of the present invention.

As shown in FIG. 19, a character input device 10 according to the present invention is implemented as a paper LCD (E-Paper LCD) 60 that may be folded or rolled. The input tool 30 is provided to enable directional input through contact with or contact movement on the paper LCD 60.

Figure 20:
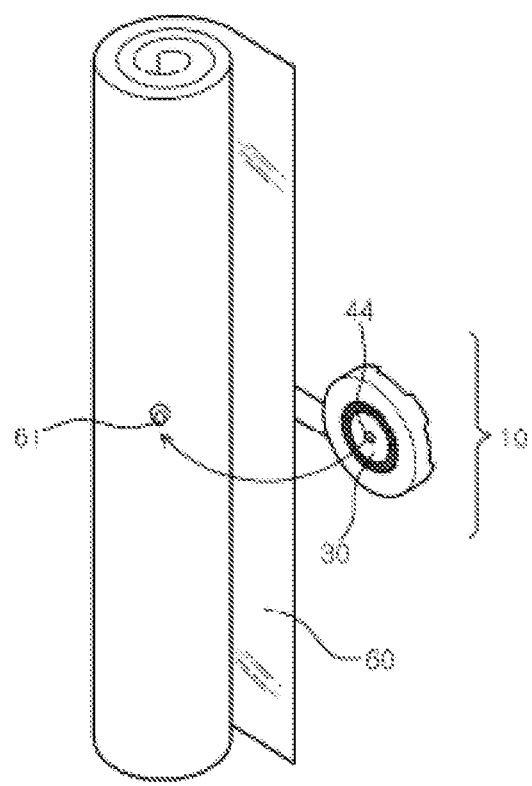
FIG. 20 is a perspective view showing the state in which the paper LCD of FIG. 19 is rolled.

Such a paper LCD 60 may be kept/carried in a folded or rolled state, like paper, as shown in FIG. 20, and may be used by displaying information in an unfolded state.

The paper LCD 60 may be kept/carried in such a way that a fastening element 61 formed to protrude from a predetermined location in the folded or rolled state is fastened to a fastening hole 44 formed in the input tool 30.

The fastening hole 44 may also be formed in an input tool protection case (not shown) required to protect the input tool 30.

The paper LCD 60 may be provided in various types, for example, a flexible display that can be flexibly bent, similar to the paper LCD 60.

Further, the detection unit 20 formed on a portion of the paper LCD 60 may be provided to have various shapes, for example, a rectangular shape, as shown in FIG. 19, or a diamond shape, a circular shape, etc.

The number of detection units 20 may be variously set. For example, two or more detection units (for example, a pair of detection units) may be provided on both left and right sides of the paper LCD.

Further, a detection unit (for example, an optical sensor mounted on the bottom of an optical mouse) capable of detecting the input operation of the input tool 30 may be provided on the input tool 30 itself without a separate detection unit 20 being provided on the paper LCD 60.

In this case, the input tool 30 may be provided as two or more units so that they are put on the detection units to correspond to the detection units, respectively, and input is possible in two sets.

Further, in this case, the control unit stores in advance data about predetermined contact forms (for example, the sectional shape of a contact part), detected when the input tools 30 are put on the detection units 20. When a predetermined contact form is detected as the input tools 30 are put on the detection units 20, the control unit switches a mode to a character input mode and allows a character keyboard to appear, thus enabling character input to be performed.

Of course, it is possible to assign a detection function to an input tool 30 itself, so that, when the input tool 30 is put on a detection unit, a predetermined contact form may be detected, and so that, when the contact form is detected, a mode is switched to a character input mode, and a character keyboard appears, thus enabling character input to be performed.

Further, it is possible that a predetermined reference input unit is provided on the detection unit 20, so that first to third direction indication locations are arranged around the reference input unit, and directional input may be performed using the input tool 30 on the basis of the reference input unit.

Meanwhile, although not shown in the drawings, the detection unit 20 of the present invention may be a touch screen provided with a tactile sensor. At this time, since the detection unit 20 can detect vertical pressing and horizontal pressing fourth directional input and fifth directional input are possible through the detection of vertical pressing and horizontal pressing.

In more detail, when the detection unit 20 can detect horizontal pressing and vertical pressing the input tool 30 is provided to horizontally and vertically press a location on the detection unit 20. At this time, the input tool 30 may be formed in various shapes, for example, the shapes of the input tool 30, as described in the above embodiments, or the shape of a simple disk.

Further, the control unit generates a plurality of fourth direction indication locations (not shown) and fifth direction indication locations (not shown) on the basis of a portion in which the input tool 30 comes into contact with the detection unit 20, detects fourth directional input, which is performed in such a way that the input tool 30 vertically presses any one of the fourth direction indication locations, in response to a detection signal output from the detection unit 20, extracts data assigned to the fourth direction indication location from a memory unit, and inputs the extracted data.

Further, the control unit detects fifth directional input, which is performed in such a way that the input tool 30 horizontally presses any one of the fifth direction indication locations, in response to a detection signal output from the detection unit 20, extracts data assigned to the fifth direction indication location from the memory unit, and inputs the extracted data.

Furthermore, fourth directional input and fifth directional input may be performed together with the above-described first to third directional inputs M, P, and T. At this time, when respective directional inputs are performed, the control unit performs input processing in such a way as to discriminate respective directional inputs on the basis of detection signals output from the detection unit 20, to extract data corresponding to respective directional inputs from the memory unit and to input the extracted data.

Further, the detection unit may detect tilting pressing and the control unit may enable data assigned to a sixth direction indication location to be input through sixth directional input using the tilting pressing of the input tool.

Those skilled in the art will appreciate that the above-described present invention is not limited to the above embodiments and drawings, and various substitutions, modifications, and changes are possible, without departing from the scope and spirit of the invention.

For example, the present invention has been described on the basis of touch input and pressing input on the touch screen of a portable mobile communication terminal, but may be applied to various products, such as an electronic dictionary, an MP3 player or a Personal Digital Assistant (PDA) that enable touch input and pressing input to be performed using the touch screen.

Further, the first to fifth direction indication locations described in the present embodiments may be arranged at different locations, but two or more locations may be arranged together. Even when the locations are arranged together, directional inputs performed at respective direction indication locations are different from each other, and thus the control unit can discriminatively process respective directional inputs.

The invention claimed is:

1. An input device, comprising:
a detection unit for detecting one or more radially directed input forms of vertical pressing, horizontal pressing, tilting pressing, contact, and contact movement;
an input tool for enabling two or more radially directed input forms corresponding to each of the one or more radially directed input forms detectable by the detection unit to be performed, one or more portions of the input tool selectively contacting with the detection unit; and
a controller for generating a plurality of radial direction indication locations corresponding to the two or more radially directed input forms performed by the input tool, extracting data assigned to the radial direction indication locations corresponding to the two or more radially directed input forms from a memory unit, and inputting the extracted data when the one or more radially directed input forms are detected by the detection unit,
the controller generates one or more of a plurality of first direction indication locations M, and one or more of a plurality of second direction indication locations P on a basis of a portion of the input tool contacting with the detection unit, detects first directional input performed in such a way that the input tool is moved to any one of the first direction indication locations M while contacting with the detection unit, in response to a detection signal output from the detection unit, detects second directional input P, which is performed in such a way that another portion of the input tool contacts with any one of the second direction indication locations P on the detection unit, in response to a detection signal output from the detection unit, extracts data assigned to the first direction indication location M or the second direction indication location P from the controller, and inputs the extracted data,
wherein the first direction indication location M and the second direction indication location P are radially arranged from a reference location S,
the reference location S is disposed at the center of the first direction indication locations M and the second direction indication locations P.

2. The input device according to claim 1, wherein:
the input tool contacts with the detection unit outside the second direction indication locations while all or part of the input tool is tilted; and
the controller generates a plurality of third direction indication locations outside the second direction indication locations on a basis of a portion of the input tool contacting with the detection unit, detects third directional input, which is performed in such a way that the input tool contacts with any one of the third direction indication locations on the detection unit, in response to a detection signal output from the detection unit, extracts data assigned to the third direction indication location from the controller, and inputs the extracted data.

3. The input device according to claim 1, wherein the input tool comprises a plate-shaped first input unit, a projection element configured to project from the plate-shaped first input unit to be elastically deformable, so that the projection element is fixed to the detection unit or so that the projection element is provided with a non-slip element on its front portion and contacts with the detection unit through the non-slip element, and a second input unit formed to protrude from a middle of the projection element in parallel with the plate-shaped first input unit at a length shorter than that of the plate-shaped first input unit, thus contacting with the detection unit through elastic deformation of the projection element during movement of the plate-shaped first input unit.

4. The input device according to claim 1, wherein the first directional input is performed through multi-stage input implemented in two or more stages, according to a movement distance of the input tool.

5. The input device according to claim 1, wherein the input tool comprises a plate-shaped input unit, a central contact element formed at a center of the plate-shaped input unit and configured to perform central input while coming into contact with the detection unit through pressing of the plate-shaped input unit and perform first directional input by moving to a first direction indication location while the central contact element comes into contact with the detection, and a second direction contact element formed at a location, corresponding to the second direction indication locations, on an outer circumferential portion of the plate-shaped input unit and configured to perform second directional input while coming into contact with the detection unit through pressing of the plate-shaped input unit.

6. The input device according to claim 1, wherein: the input tool comprises a plate-shaped input unit made of elastically deformable material, a support contact element formed in a cylindrical shape, and a central contact element formed inside the support contact element at a center of the plate-shaped input unit to have a length shorter than that of the support contact element and configured to perform central input while coming into contact with the detection unit through elastic deformation of the plate-shaped input unit when the plate-shaped input unit is pressed in a state in which the support contact element contacts with the detection unit and to perform first directional input by moving to a first direction indication location while the central contact element contacts with the detection unit; and the second directional input is performed in such a way that an outer circumferential portion of the plate-shaped input unit is pressed and the plate-shaped input unit contacts with the detection unit.

7. The input device according to claim 6, wherein:
the plate-shaped input unit is formed such that a top thereof has a convex spherical shape; and
the input tool further comprises a third direction contact element provided on the top of the plate-shaped input unit and configured to perform third directional input while sliding along the plate-shaped input unit and contacting with the detection unit through pressing applied in a direction of inclination.

8. The input device according to claim 1, wherein the input tool comprises a plate-shaped input unit made of elastically deformable material, a support contact element formed in a cylindrical shape on an outer circumferential portion of the plate-shaped input unit, a central contact element formed at a center of the plate-shaped input unit to have a length shorter than that of the support contact element and configured to perform central input while contacting with the detection unit through elastic deformation of the plate-shaped input unit when the plate-shaped input unit is pressed in a state in which the support contact element contacts with the detection unit and to perform first directional input by moving to a first direction indication location while the central contact element contacts with the detection unit, and a second direction contact element formed inside the support contact element to correspond to the second direction indication locations and configured to perform second directional input while contacting with the detection through elastic deformation of the plate-shaped input unit.

9. The input device according to claim 1, wherein:
the input tool comprises a plate-shaped input unit, a central contact element formed on a bottom of the plate-shaped input unit in a cylindrical shape, and a plurality of second direction contact elements formed outside the central contact element to protrude toward the detection unit at different lengths; and
the second direction contact elements sequentially contact with the detection unit according to a tilting degree of the plate-shaped input unit at a time of performing second directional input, thus enabling multi-stage input to be performed in two or more stages.

10. The input device according to claim 1, wherein the plate-shaped input unit comprises an elastically deformable connection element connected to a case which accommodates the detection unit so that the plate-shaped input unit enables contact, contact movement or tilting to be performed with respect to the detection unit.

11. The input device according to claim 10, wherein the connection element comprises:
a main body connected to the case; and
an elastic connection part formed to be elastically deformable and configured to connect the plate-shaped input unit to the main body.

12. The input device according to claim 11, wherein the main body is formed in a bar shape and both ends thereof are bent in a '⊂' shape, so that the main body is supported to be slidably movable on the case in order to allow the plate-shaped input unit to become close to or far from the detection unit.

13. The input device according to claim 11, wherein the main body comprises a hinge part disposed between the case and the main body and configured to enable the plate-shaped input unit to be put on the detection unit in such a way that the main body is rotated with respect to the case through the hinge part.

14. The input device according to claim 1, wherein the controller automatically switches a mode to a character input mode when the detection unit contacts with the input tool.

15. The input device according to claim 14, wherein the controller generates a keyboard display unit for displaying characters, which can be input through respective directional inputs, around the input tool when the mode is switched to the character input mode.

16. The input device according to claim 1, wherein the detection unit is provided on a portion of a paper Liquid Crystal Display (LCD)(E-Paper LCD) that can be folded or rolled.

17. The input device according to claim 1, wherein:
the detection unit detects horizontal pressing vertical pressing and contact;
the input tool is provided to horizontally and vertically press a portion of the detection unit; and
the controller generates a plurality of fourth direction indication locations and fifth direction indication locations on a basis of a portion in which the input tool contacts with the detection unit, detects fourth directional input, which is performed in such a way that the input tool vertically presses any one of the fourth direction indication locations, in response to a detection signal output from the detection unit, extracts data assigned to the fourth direction indication location from the memory unit, inputs the extracted data, detects fifth directional input, which is performed in such a way that the input tool horizontally presses any one of the fifth direction indication locations, in response to a detection signal output from the detection unit, extracts data assigned to the fifth direction indication location from the memory unit, and inputs the extracted data.

18. The input device according to claim 17, wherein the detection unit is a touch screen provided with a tactile sensor.

19. The input device according to claim 17, wherein the input tool is formed in a disk shape.

* * * * *